United States Patent
Nakashima et al.

(10) Patent No.: US 7,579,791 B2
(45) Date of Patent: Aug. 25, 2009

(54) VEHICLE REARMOST SEAT CONTROL SYSTEM

(75) Inventors: Kazuhiro Nakashima, Kariya (JP);
Kentarou Teshima, Kariya (JP);
Kenichi Ogino, Toyota (JP)

(73) Assignee: Denso Corporation, Kariya, Aichi-pref. (JP)

( * ) Notice: Subject to any disclaimer, the term of this patent is extended or adjusted under 35 U.S.C. 154(b) by 224 days.

(21) Appl. No.: 11/797,423

(22) Filed: May 3, 2007

(65) Prior Publication Data

US 2008/0001565 A1    Jan. 3, 2008

(30) Foreign Application Priority Data

Jun. 30, 2006    (JP) .............................. 2006-182074

(51) Int. Cl.
*G05D 1/02*    (2006.01)
*G05D 3/00*    (2006.01)
(52) U.S. Cl. .................. 318/16; 318/266; 318/466; 307/10.1; 180/271; 180/287
(58) Field of Classification Search .............. 318/16, 318/266, 466; 340/457.1, 5.72; 180/271, 180/287; 701/45, 49
See application file for complete search history.

(56) References Cited

U.S. PATENT DOCUMENTS

| | | | | |
|---|---|---|---|---|
| 4,997,053 A | * | 3/1991 | Drori et al. ................ | 180/287 |
| 5,812,399 A | * | 9/1998 | Judic et al. ................ | 701/49 |
| 6,369,529 B1 | * | 4/2002 | McClintock et al. ........ | 318/16 |
| 2002/0065585 A1 | * | 5/2002 | Obradovich ................ | 701/1 |
| 2004/0045758 A1 | * | 3/2004 | Breed et al. ................ | 180/271 |
| 2006/0139159 A1 | * | 6/2006 | Lee et al. ................... | 340/457 |
| 2006/0265113 A1 | * | 11/2006 | Kobayashi et al. .......... | 701/45 |
| 2007/0013218 A1 | * | 1/2007 | Kayumi et al. ............. | 297/344.1 |
| 2007/0290554 A1 | * | 12/2007 | Teshima et al. ............ | 307/10.1 |
| 2008/0001708 A1 | * | 1/2008 | Nakashima et al. ........ | 340/5.72 |
| 2008/0238647 A1 | * | 10/2008 | Abe ......................... | 340/457.1 |

FOREIGN PATENT DOCUMENTS

JP     4-354499      12/1992
JP     2000-104429   4/2000

OTHER PUBLICATIONS

Chinese Official Action dated Sep. 19, 2008 issued in corresponding Chinese Application No. 200710127515.8 with English translation.

* cited by examiner

*Primary Examiner*—Paul Ip
(74) *Attorney, Agent, or Firm*—Nixon & Vanderhye PC (57) ABSTRACT

A vehicle-side device receives a response signal transmitted from an electronic key carried by a user and executes a matching process to check whether the key is an authorized one. When the matching is confirmed and the operation of a sensor/switch disposed on a door is detected, a given door is unlocked. The device determines a door which is to be opened by the user, and the seat state is controlled on the basis the door to be opened. If the door to be opened is for rearmost seats, the rearmost seats are automatically controlled to a seating state or a loading state based on detection of absence or presence of an object on the rearmost seats.

8 Claims, 5 Drawing Sheets

VEHICLE REARMOST SEAT CONTROL SYSTEM

CROSS REFERENCE TO RELATED APPLICATION

This application is based on and incorporates herein by reference Japanese Patent Application No. 2006-182074 filed on Jun. 30, 2006.

FIELD OF THE INVENTION

The present invention relates to a vehicle rearmost seat control system that moves a rearmost seat of a vehicle between a loading state and a seating state.

BACKGROUND OF THE INVENTION

In conventional vehicles, rearmost seats are retracted or folded, or moved forward to change the size of a luggage compartment. When there is a large amount of luggage that is loaded in the vehicle, the rearmost seats are moved to a loading state where a larger amount of luggage can be loaded. On the contrary, when there are a large number of passengers, the rearmost seats are moved to a seating state in which the passengers can be seated.

Some vehicles have a rearmost seat driver device for automatically moving the rearmost seats. An operation switch for operating the rearmost seat driver device is disposed at a given position in the vehicle. When the operation switch is actuated, the rearmost seats are automatically moved from the loading state in which a large amount of luggage can be loaded to a seating state in which the passengers can be seated, or conversely from the seating state to the loading state. The operation switch is normally positioned so as to be operated when a luggage compartment door is opened.

A remote control device is proposed in, for example, JP 2000-104429A, as a part of a smart key system that is capable of unlocking or locking doors of a vehicle without operating an electronic key. In this device, bidirectional communication is conducted to determine whether the key is an authorized (regular) key or not. When it is determined that the key is the authorized key in a door locked state, the doors are automatically unlocked.

When a vehicle has a smart key system and a rearmost seat driver device, moving rearmost seats from the loading state to the seating state, or reversely from the seating state to the loading state can be relatively comfortably conducted. Thus, it is possible to conveniently load the luggage or seat the passengers.

However, even if the smart key system and the rearmost seat driver device are equipped in the vehicle, loading of luggage and seating of passengers are sometimes not sufficiently conveniently conducted. That is, in the conventional vehicle, the rearmost seat driver device is driven to move the rearmost seats after an operation switch that is disposed in the vehicle is operated by a user. In order to operate the operation switch, it is necessary to open the door. For this reason, it takes some time to make the rearmost seats in a desired state. Also, since it is necessary to operate the operation switch, all users must know where the operation switch is disposed. However, for example, a user, who is not an owner of the vehicle but rents it, usually does not know the position of the operation switch and hence may not be able to drive the rearmost seat driver device.

SUMMARY OF THE INVENTION

An object of the present invention is to provide a vehicle rearmost seat control system that is readily usable by any users.

According to one aspect, a vehicle rearmost seat control system includes a mobile device, a rearmost seat driver device, a receiver and a rearmost seat control unit. The mobile device is carried by a user and transmits a rearmost seat drive signal. The rearmost seat driver device moves a rearmost seat between a loading state and a seating state in a vehicle. The receiver is disposed in a vehicle and receives the rearmost seat drive signal. The rearmost seat control unit controls a state of the rearmost seat by the rearmost seat driver device in response to the rearmost seat drive signal.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENTS

First Embodiment

Figure 1:
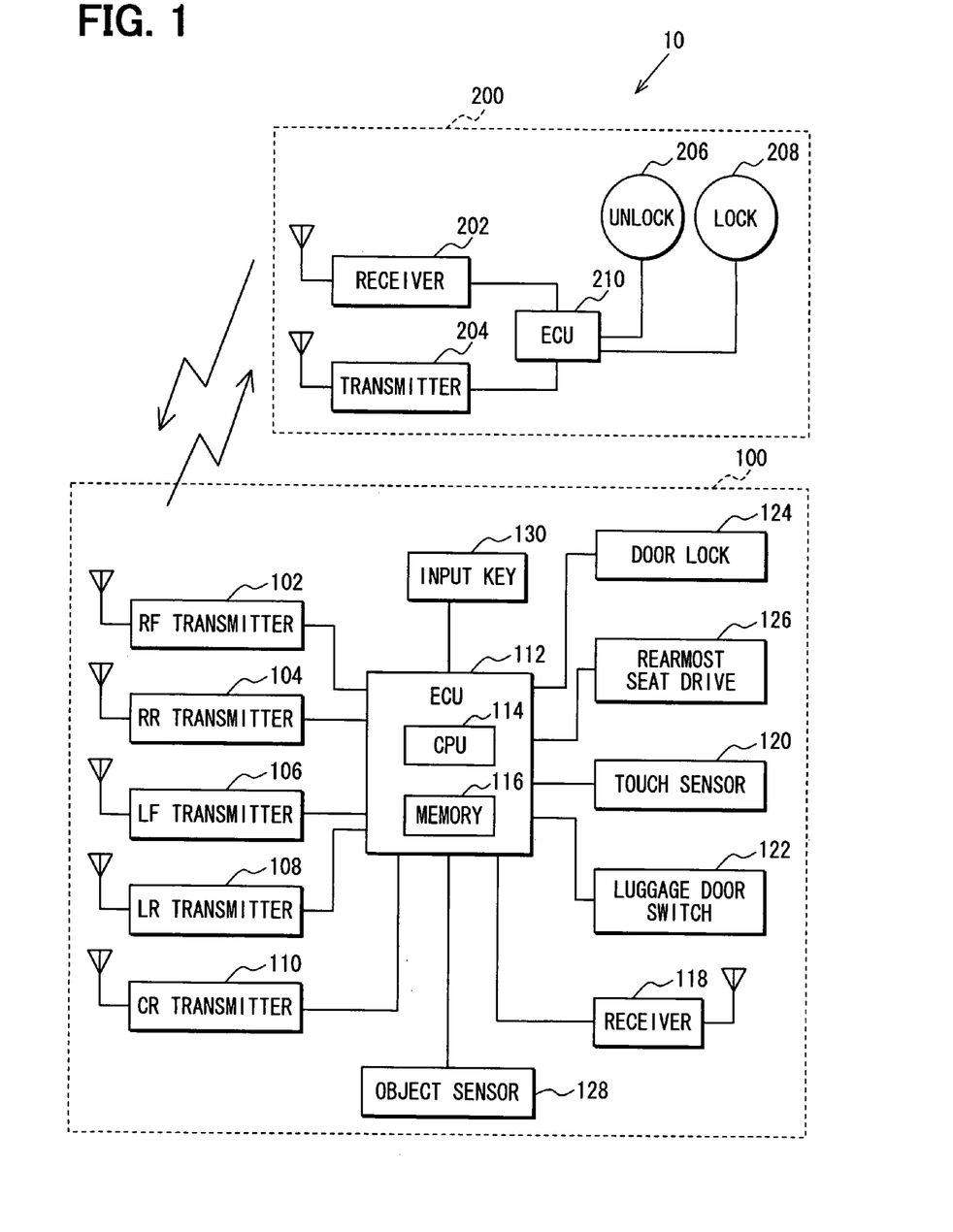
FIG. 1 is a block diagram showing a vehicle rearmost seat control system according to a first embodiment of the present invention.

Referring first to FIG. 1, a vehicle rearmost seat control system 10 includes a vehicle-side device 100 and an electronic key 200 that is a mobile device carried by a vehicle owner or a user.

The vehicle-side device 100 has transmitters 102 to 110. The right front (FR) transmitter 102 is disposed on a right front door for entrance with respect to a driver seat, or in the vicinity of the right front door. This transmitter 102 forms a detection area for detecting the key 200 on the right side of the right front door (outside of the vehicle in the vehicle width direction).

The right rear (RR) transmitter 104 is disposed on a right rear door for entrance with respect to second-row seats and third-row seats, or in the vicinity of the right rear door. This transmitter 104 forms a detection area on the right side of the right rear door. The left front (LF) transmitter 106 is disposed on a left front door for entrance with respect to a front passenger seat, or in the vicinity of the left front door. This transmitter 106 forms a detection area on the left side of the left front door. The left rear (LR) transmitter 108 is disposed on a left rear door or in the vicinity of the left rear door, and forms a detection area on the left side of the left rear door. The center rear (CR) transmitter 110 is disposed on a luggage door or in the vicinity of the luggage door, and forms a detection area on the rear side of the luggage door. Each detection area is, for example, about 0.7 to 1.0 meters in radius from the corresponding transmitter 102 to 110.

An electronic control unit (ECU) 112 is a computer having a central processing unit (CPU) 114 and a memory 116. The CPU 114 executes various processing according to programs that are stored in the memory 116. For example, when the vehicle is parked and the doors are locked, the CPU 114 outputs a request signal that is a transmission request signal to those five transmitters 102 to 110 sequentially, that is, in order every given period that is set to a short period of time such as about 0.3 seconds. When the request signal is supplied to the transmitters 102 to 110, the transmitters 102 to 110 sequentially transmit the request signals that define respective detection areas.

When the key 200 is present in any detection area in which the request signal can be receivable, a response signal that responds to the request signal is returned from the key 200. A receiver 118 is provided to receive the response signal, and is located at a given position in the interior of the vehicle. Also, a door lock signal and a door unlock signal are transmitted from the key 200 so that they are received by the receiver 118. The signals that have been received by the receiver 118 are output to the ECU 112.

Since the CPU 114 outputs instructions to those five transmitters 102 to 110 in order in the given period as described above, it is possible to determine from which detection area the response signal has been transmitted, that is, in which detection area the key 200 is present, by determining when the response signal has been received.

Touch sensors 120 are disposed on door outside handles of the four entrance doors (right front seat door, right rear seat door, left front seat door, left rear seat door), respectively. Each of the touch sensors 120 detects that the user touches the corresponding handle, and then supplies a signal indicative of this touch to the ECU 112. A luggage door switch 122 is a switch that is operated by the user when opening the luggage door. The luggage door switch 122 is so positioned as to be exposed to the outside of the vehicle on the luggage door. Then, when the luggage door switch 122 is operated by the user, a signal indicative of this operation is supplied to the ECU 112.

A door lock mechanism 124 is provided to lock the entrance doors and the luggage door, and controlled by the ECU 112 to make those doors unlocked. Also, the entrance doors can be made locked under the control of the ECU 112. The luggage door can be also made locked under the control of the ECU 112.

A rearmost seat driver device 126 has a mechanical driving mechanism that moves the rearmost seats of the vehicle, for instance, the third-row seats from a loading state that is a loading state to a seating state, or conversely from the seating state to the loading state. In the loading state, a seat back of the seat is reclined, so that the luggage compartment is broadened so as to load a large amount of luggage, but passengers cannot sit on the third-row seat. On the other hand, in the seating state, the seat back is returned upright so that passengers are capable of sitting down on the third-row seats. The rearmost seat driver device 126 is controlled by the CPU 114, and a signal indicative of the position (this position corresponds to a state of the third-row seats) of a mechanical driving mechanism is supplied to the ECU 112 from the rearmost seat driver device 126.

An object sensor 128 is provided to detect an object that exists on the third-row seats. The object sensor 128 is capable of detecting an inanimate object such as luggage and a person. It may be made up of, for example, load sensors that are disposed on a seat surface of the third-row seats and a top surface of the seat that is retracted, respectively. Also, the object sensor 128 can be formed of a noncontact sensor such as a photoelectric sensor.

The memory 116 of the ECU 112 stores control programs defining contents of the rearmost seat driver device 126. Those programs are executed by the CPU 114 when the receiver 118 receives signals from the key 200. The control contents are distinguished according to whether the signal that has been received by the receiver 118 is the response signal or the unlock signal. In addition, when the received signal is the response signal, the control contents are distinguished according to which door has been operated. The control contents stored in the memory 116 are, for example, (1) the rearmost seats are driven to the seating state by the rearmost seat driver device 126 when the received signal is the response signal, and it is detected that the user's hand touches the touch sensors 120 that are disposed on the right and left rear doors, and (2) the rearmost seats are driven to the loading state by the rearmost seat driver device 126 when the received signal is the response signal, and the operation of the luggage door switch 122 is detected. There are provided plural keys 200, and the control contents of the rearmost seat driver device 126 are stored in each of the keys 200.

The input key 130 is operated when the control contents of the rearmost seat driver device 126 which are stored in the memory 116 are changed by the user. With the operation of the input key 130, the control contents of the rearmost seat driver device 126 can be made different according to each of the keys 200 in such a manner that a certain key 200 executes the above operation (1) and (2), but another key 200 executes only one of the above operations (1) and (2).

Each key 200 includes a receiver 202 as a receiving section that receives the request signal transmitted from the transmitters 102 to 110, a transmitter 204 as a transmitting section that transmits the response signal, an unlock switch 206 that is operated when the user instructs the transmission of the unlock signal, a lock switch 208 that is operated when the user instructs the transmission of the lock signal, and an ECU 210.

The ECU 210 is supplied with the request signal that has been received by the receiver 202. When the request signal is supplied, the ECU 210 generates the response signal to output the response signal to the transmitter 204. Also, when the signals from the unlock switch 206 and the lock switch 208 are input to the ECU 210, the ECU 210 outputs the unlock signal and the lock signal to the transmitter 204. When the unlock signal or the lock signal is supplied to the transmitter 204, the transmitter 204 sends the unlock signal or the lock signal.

Figure 2:
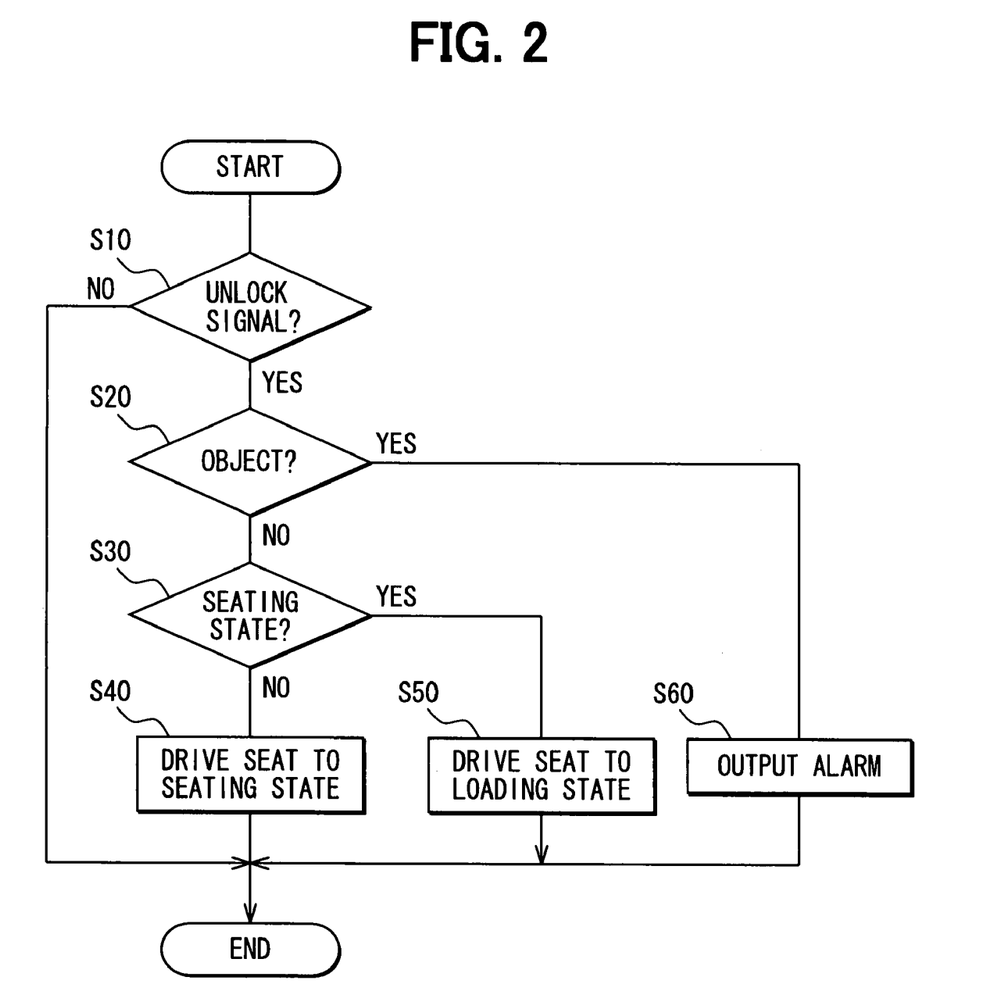
FIG. 2 is a flowchart showing a process of detecting an operation of an unlock switch to control a state of seats on a rearmost row.
Figure 3:
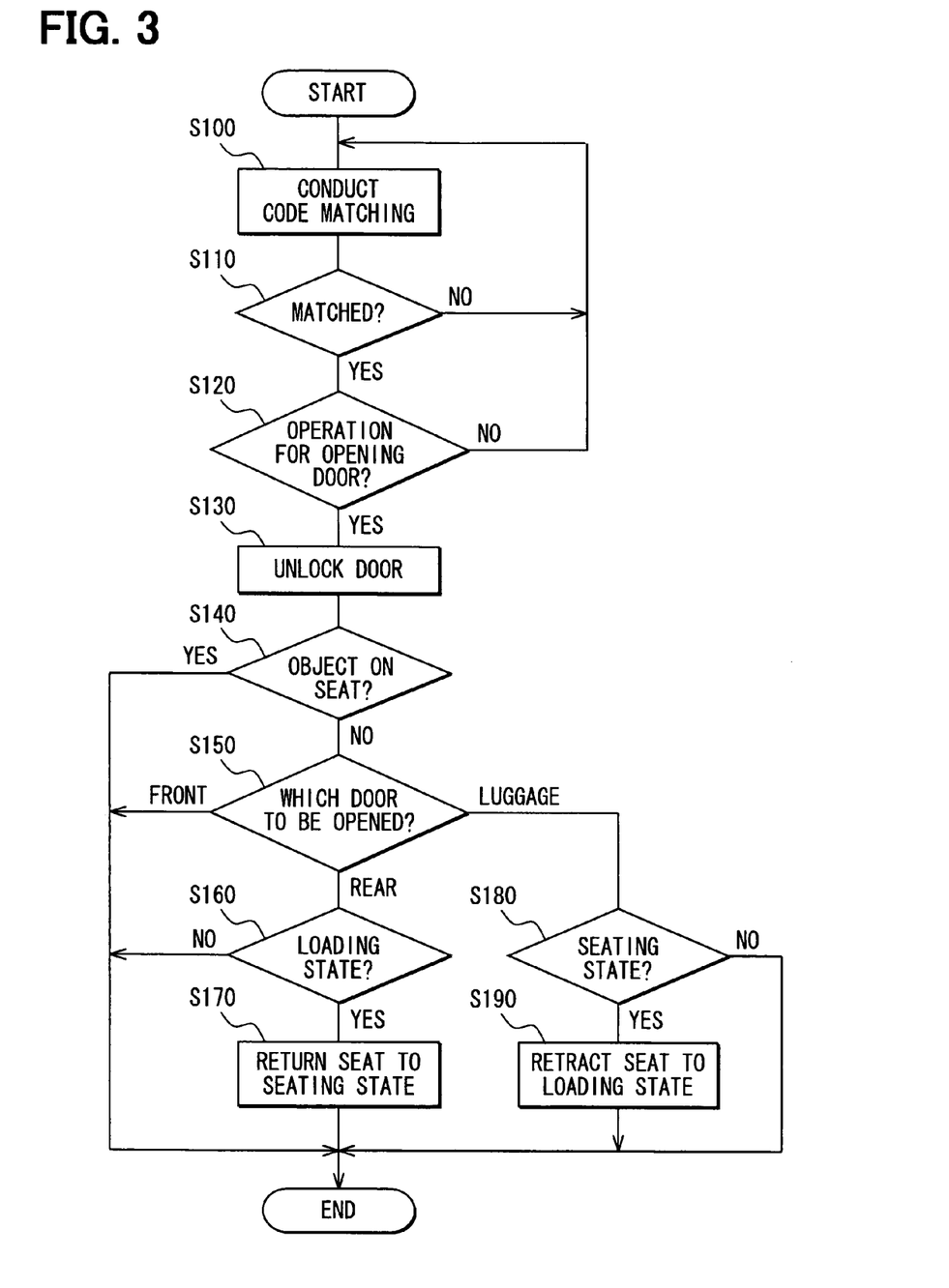
FIG. 3 is a flowchart showing a process of detecting an approach of an electronic key to control a state of seats on a rearmost row.

The CPU 114 operates as a rearmost seat control unit. FIGS. 2 and 3 are flowcharts showing the control contents of the rearmost seat control unit, respectively. FIG. 2 shows a process of detecting the operation of the unlock switch 206 for controlling the state of the rearmost seats, that is, third-row seats. FIG. 3 shows a process of detecting that the key 200 is near the vehicle for controlling the state of the third-row seats.

The processing shown in FIG. 2 is executed at every predetermined period. At step S10, it is checked whether the receiver 118 has received the unlock signal or not from the key 200. When the determination is NO (negative), this routine is terminated once. On the other hand, when the determination is YES (affirmative), that is, when the receiver 118 has received the unlock signal, control is advanced to step S20. It is checked whether an object has been detected on or above the third-row seats by the sensor 128 or not. When the receiver 118 has received the unlock signal, the door lock mechanism 124 is controlled, and all of the entrance doors are also unlocked.

When the determination is NO at step S20, the state of the third-row seat is checked at step S30. When the third-row seat is in the retracted or inclined state, that is, not in the normal seating state but in the loading state, control is advanced to step S40, and the third-row seat is returned to the seating state from the loading state. On the other hand, when the state of the third-row seat is in the seating state, control is advanced to step S50, and the third-row seat is driven to the loading state.

As described above, the unlock signal that is transmitted from the key 200 by operating the unlock switch 206 also serves as a rearmost seat drive signal that instructs the driving of the third-row seats. Also, the unlock switch 206 that is operated by the user in order to transmit the unlock signal functions as a transmission instruction switch. When the receiver 118 receives the unlock signal, the third-row seats are made in a state different from that at the time of receiving the unlock signal in the seating state and the loading state.

However, when the determination is YES at step S20, that is, when an object is detected on the seats, it is not preferable to move the third-row seats. Under the circumstances, control is advanced to step S60, only an alarm indicating that the operation is disenabled is output from a given speaker, thereby completing the processing without changing the state of the third-row seat.

The processing shown in FIG. 3 is executed when the response signal has been supplied to the ECU 112 from the receiver 118 in a state where the vehicle is parked and the doors are locked.

First, at step S100, the matching of a code included in the response signal and specific to each key is conducted. Then, at step S110, it is checked whether the code matched a code stored in the memory 116 and specific to the key. When the determination is NO, control is returned to step S100 because the key is not an authorized key. On the other hand, when the determination is YES, since the key 200 that has sent the response signal is an authorized key, the control is advanced to step S120.

steps S120 and S130 are processing for door lock state control. At step S120, it is checked whether an operation for door opening has been made. Here, it is checked whether the touch sensor 120 has been touched or not, or whether the luggage door switch 122 has been operated or not, within a given period of time after it is determined that the code matching is confirmed at step S110. When the determination is NO, the control is returned to step S100.

On the other hand, when it is detected that the touch sensor 120 has been touched, or when luggage door switch 122 has been operated, the determination is YES at step S120, and the control is advanced to step S130. At step S130, when it is detected that the touch sensor 120 has been touched, the four entrance doors are automatically unlocked. Also, when it is detected that the luggage door switch 122 has been operated, the luggage door is unlocked. Thus, the user is enabled to open the doors without using the key 200.

In subsequent step S140, it is checked whether an object is detected on (or above) the third-row seats by the object sensor 128 or not. When the determination is YES at step S140, that is, when the object has been detected on the seats, it is not preferable to move the third-row seats. For this reason, the processing is completed as it is.

On the other hand, when the determination is NO at step S140, it is determined which door is to be opened by the user at step S150. The determination is conducted on the basis of a signal from the touch sensor 120 that is disposed on each of the entrance doors and a signal from the luggage door switch 122 that is disposed on the luggage door.

When the front seat door is to be opened by the user, the processing is completed. When the rear seat door is to be opened by the user, the control is advanced to step S160, and the state of the third-row seats is determined. Since the rear seat door is used in sitting on the third-row seat, it is highly possible that a person sits on the third-row seat when the rear seat door is to be opened by the user. For this reason, when it is determined that the seats are in the loading state (YES) at step S160, the control is advanced to step S170, and the third-row seats are returned to the seating state by the rearmost seat driver device 126. On the other hand, when the seats have been already in the seating state (NO), the processing is completed as it is.

When it is determined that the luggage door is to be opened by the user at step S150, the control is advanced to step S180. The state of the third-row seats is determined at step S180 as at step S160. The user is going to open the luggage door when luggage is loaded in the luggage compartment, and it is necessary to retract the third-row seats when a large amount of luggage is loaded in the luggage compartment. For this reason, when it is determined that the seat is in the seating state (YES) at step S180, the control is advanced to step S190, and the third-row seats are retracted to the loading state by the rearmost seat driver device 126. On the other hand, when the seats have already been in the loading state, the processing is completed as it is.

As described above, according to this embodiment, the unlock signal, which is also the rearmost seat drive signal, is transmitted from the key 200 carried by the user, and the state of the third-row seats is controlled by the rearmost seat driver device 126 on the basis that the unlock signal has been received by the receiver 118, and the entrance doors are unlocked. For this reason, it is possible that the state of the third-row seats is automatically controlled the entrance doors are automatically unlocked.

Also, the user is capable of controlling the state of the third-row seats with the operation of the unlock switch 206. In addition, when a user who carries the authorized key 200 enters into the detection area, and the user or another user operates the luggage door switch 122, the state of the third-row seat is automatically controlled to the loading state. Also, a user who carries the authorized key 200 enters into the detection area, and the user or another user grips the door handle of the rear seat door, thereby making it possible to make the third-row seats in the seating state.

Furthermore, when an object has been detected on the third-row seats, the rearmost seat driver device 126 is not driven, thereby making it possible to prevent such an inconvenience that the third-row seats are unavoidably moved even if the object exists above the third-row seats.

Second Embodiment

Figure 4:
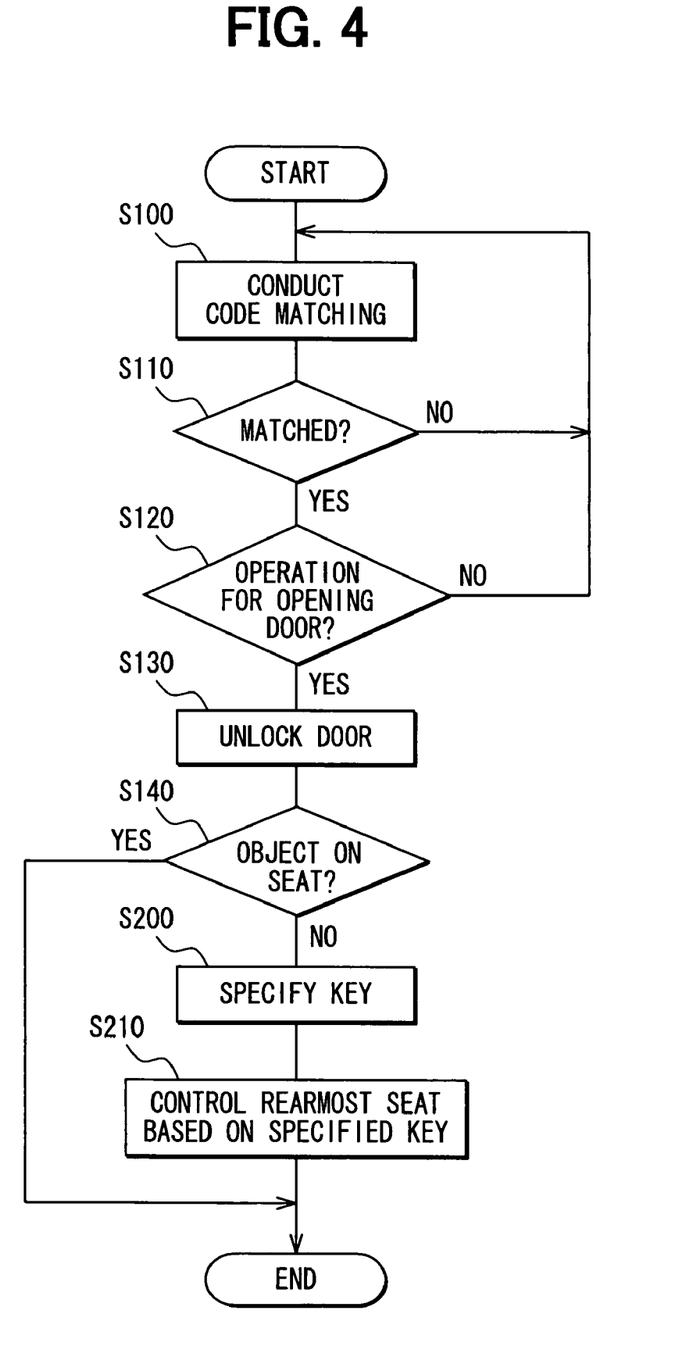
FIG. 4 is a flowchart showing a process that is executed in a second embodiment instead of the process shown in FIG. 3.

The second embodiment is different from the first embodiment only in that the processing shown in FIG. 4 is executed instead of the processing shown in FIG. 3. Specifically, steps S200 to S210 are executed instead of steps S150 to S190 of FIG. 3.

Step S200 is processing for specifying a mobile device, and specifies which one of plural keys 200 that have been registered in advance. This may be made on the basis of the ID code included in the response signal that has been transmitted from the key 200 and confirmed as the authorized one at step S110.

In a subsequent step S210, the state of the third-row seats are determined on the basis of the state that is specified at step S200 and the control contents that are stored in the memory 116. Then, when the state of the third-row seats at that time is different from the determined state, the rearmost seat driver device 126 is driven to move the third-row seat.

According to the second embodiment, the control contents of the state of the third-row seats are determined depending on which of the plural keys 200 that have been registered in advance is matched with the key carried by the user, and the control contents can be changed by means of the input key 130. Therefore, the user is capable of making the control contents of the state of the third-row seat different depending on the key 200, and there can be provided the vehicle rearmost seat control system that is easily used by the user.

The above embodiments may be modified in various ways.

Figure 5:
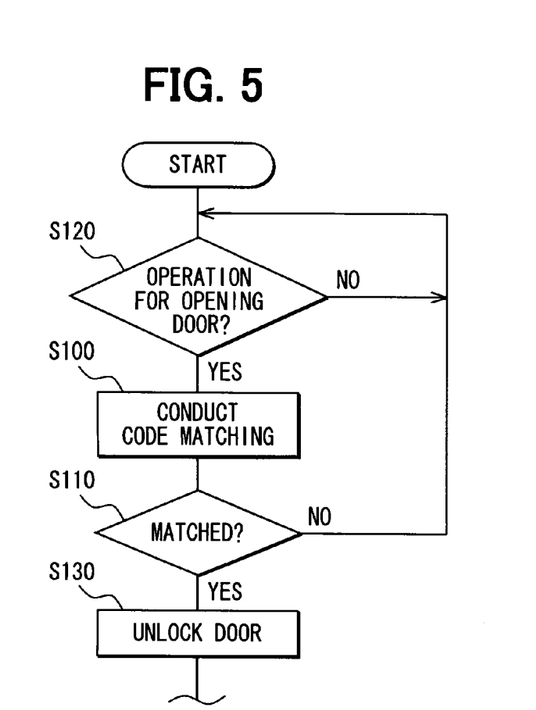
FIG. 5 is a flowchart showing a process that is executed instead of the processes shown in FIGS. 3 and 4.

For instance, in the above embodiments, the confirmation of code matching (S100) is made before the time when it is detected (S120) that the touch sensor 120 is touched, or the luggage door switch 122 is operated. Alternatively, it is possible to transmit the request signal after the signal from the touch sensor 120 or the luggage door switch 122 is inputted. The processing in this case is shown in FIG. 5. As shown in FIG. 5, after the determination at step S120 is YES, the processing at step S100 is executed to conduct code matching, and step S110 is then executed to check whether the code matching is confirmed or not.

The request signal is transmitted from the transmitters 102 to 108 corresponding to the entrance doors in a given period, but the request signal may be transmitted from the transmitter 110 corresponding to the luggage door after it is detected that the luggage door switch 122 has been operated.

Also, in the flowchart shown in FIG. 3, when it is detected that the touch sensor 120 has been touched, or when it is detected that the luggage door switch 122 has been operated, a given door is unlocked, and it is checked whether the state of the third-row seats is changed or not. Alternatively, it is possible that the processing based on the fact that the touch sensor 120 has been touched, or that the luggage door switch 122 has been operated is conducted on only the unlock of the door, and when another given seat state changing operation has been detected, the state of the third-row seats is changed. As the seat state changing operation, it is possible to, for example, continuously operate the sensor 120 and the switch 122 for a given period of time or longer, or operate the sensor switch 120 and the switch 122 continuously twice. Also, as the seat state changing operation, it is possible to continuously operate the switches 206 and 208 that are provided in the key 200 for a given period of time, or to operate the switches 206 and 208 continuously twice.

Figure 6:
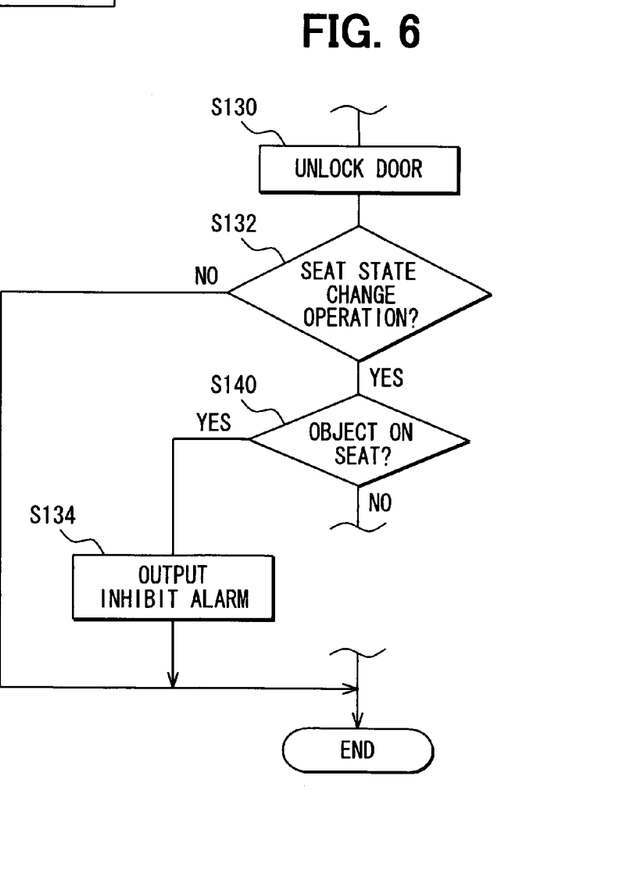
FIG. 6 is a flowchart showing an example of a process that is executed instead of the process shown in FIG. 3, when a seat state changing operation is a seat state change condition.

FIG. 6 is a flowchart showing an example of a process executed instead of that shown in FIG. 3 when the above seat state changing operation is the conditions of the seat state change. In FIG. 6, after a given door has been unlocked at step S130, it is checked whether the seat state changing operation has been detected within a given period of time or not, at step S132. When the determination is NO, the processing is completed. When the determination is YES, the processing is advanced to step S140 and the subsequent steps. In FIG. 3, when it is determined that the object exists on the seat at step S140, the processing is immediately terminated. On the other hand, in FIG. 6, the processing is terminated after the seat state change operation inhibit alarm has been output at step S134. This is because it will be helpful to notify that the seat state cannot be changed when the third-row state should not be changed contrary to the desire of the user.

The present invention can be applied to a vehicle that changes the sizes of the luggage compartment by moving the third-row seats in the forward and backward direction of the vehicle without retraction of folding, and can be also applied to a vehicle having the seats of two rows.

What is claimed is:

1. A vehicle rearmost seat control system, comprising:
   a mobile device that is carried by a user and transmits a rearmost seat drive signal;
   a rearmost seat driver device that moves a rearmost seat between a loading state and a seating state in a vehicle;
   a receiver that is disposed in the vehicle and receives the rearmost seat drive signal; and
   a rearmost seat control means for controlling a state of the rearmost seat by the rearmost seat driver device in response to the rearmost seat drive signal.

2. The vehicle rearmost seat remote control system as in claim 1, wherein:
   the mobile device has a transmission instruction switch that instructs a transmission of the rearmost seat drive signal when operated; and
   the rearmost seat control means moves the rearmost seat to one of a loading state and a seating state from the other of the loading state and the seating state in response to the rearmost seat drive signal.

3. The vehicle rearmost seat remote control system as in claim 2, wherein:
   the mobile device transmits the rearmost seat drive signal as an unlock signal for unlocking a luggage compartment door of the vehicle.

4. The vehicle rearmost seat remote control system as in claim 1, further comprising:
   a transmitter that is disposed in the vehicle and transmits a transmission request signal in a detection area within a given range outside the vehicle;
   a determining means that executes a given matching process with respect to a response signal received by the receiver for determining that the mobile device that transmits the response signal is an authorized mobile device when the matching is confirmed; and
   a door lock state control means for unlocking a vehicle door when the mobile device is determined to be the authorized mobile device,
   wherein the mobile device transmits the response signal as the rearmost seat drive signal in response to the transmission request signal transmitted from the transmitter, and
   wherein the rearmost seat control means controls the state of the rearmost seat when the vehicle door is unlocked by the door lock state control means.

5. The vehicle rearmost seat remote control system as in claim 4, wherein:
   the door lock state control means unlocks a luggage compartment door when the mobile device is determined to be the authorized mobile device, and an unlock switch disposed on the luggage compartment door is operated, and
   the rearmost seat control means controls the rearmost seat in the loading state when the luggage compartment door is unlocked.

6. The vehicle rearmost seat remote control system as in claim 4, wherein:

the door lock state control means unlocks an entrance door for the rearmost seat when the mobile device is determined to be the authorized mobile device, and a user touches a door handle of the entrance door for the rearmost seat; and the rearmost seat control means controls the rearmost seat in the seating state when the entrance door for the rearmost seat is unlocked.

7. The vehicle rearmost seat remote control system as in claim 1, further comprising:

an object sensor that detects a presence or absence of an object on the rearmost seat, wherein the rearmost seat control means disables the rearmost seat driver device to drive the rearmost seat when the object sensor detects the object on the rearmost seat.

8. The vehicle rearmost seat control system as in claim 4, further comprising:

a mobile device specifying means for specifying which of a plurality of mobile devices is the mobile device that is determined as the authorized mobile device in response to the response signal;

a memory that stores control contents of the rearmost seat which are executed by the rearmost seat control means, the control contents being different one another depending on the plurality of mobile devices; and an input device that is operable by a user for changing the control contents stored in the memory from an external side, wherein the rearmost seat control means executes one of the control contents stored in the memory which corresponds to a specified mobile device.

* * * * *